(Model.)

4 Sheets—Sheet 1.

A. AYER.
MACHINE FOR SIZING ORANGES AND OTHER FRUIT.

No. 363,974. Patented May 31, 1887.

WITNESSES:
C. Neveux
C. Sedgwick

INVENTOR:
A. Ayer
BY Munn & Co.
ATTORNEYS.

N. PETERS, Photo-Lithographer, Washington, D. C.

(Model.) 4 Sheets—Sheet 2.

A. AYER.
MACHINE FOR SIZING ORANGES AND OTHER FRUIT.

No. 363,974. Patented May 31, 1887.

WITNESSES:
C. Neveux
C. Sedgwick

INVENTOR:
A. Ayer
BY Munn & Co.
ATTORNEYS.

(Model.) 4 Sheets—Sheet 3.
A. AYER.
MACHINE FOR SIZING ORANGES AND OTHER FRUIT.
No. 363,974. Patented May 31, 1887.
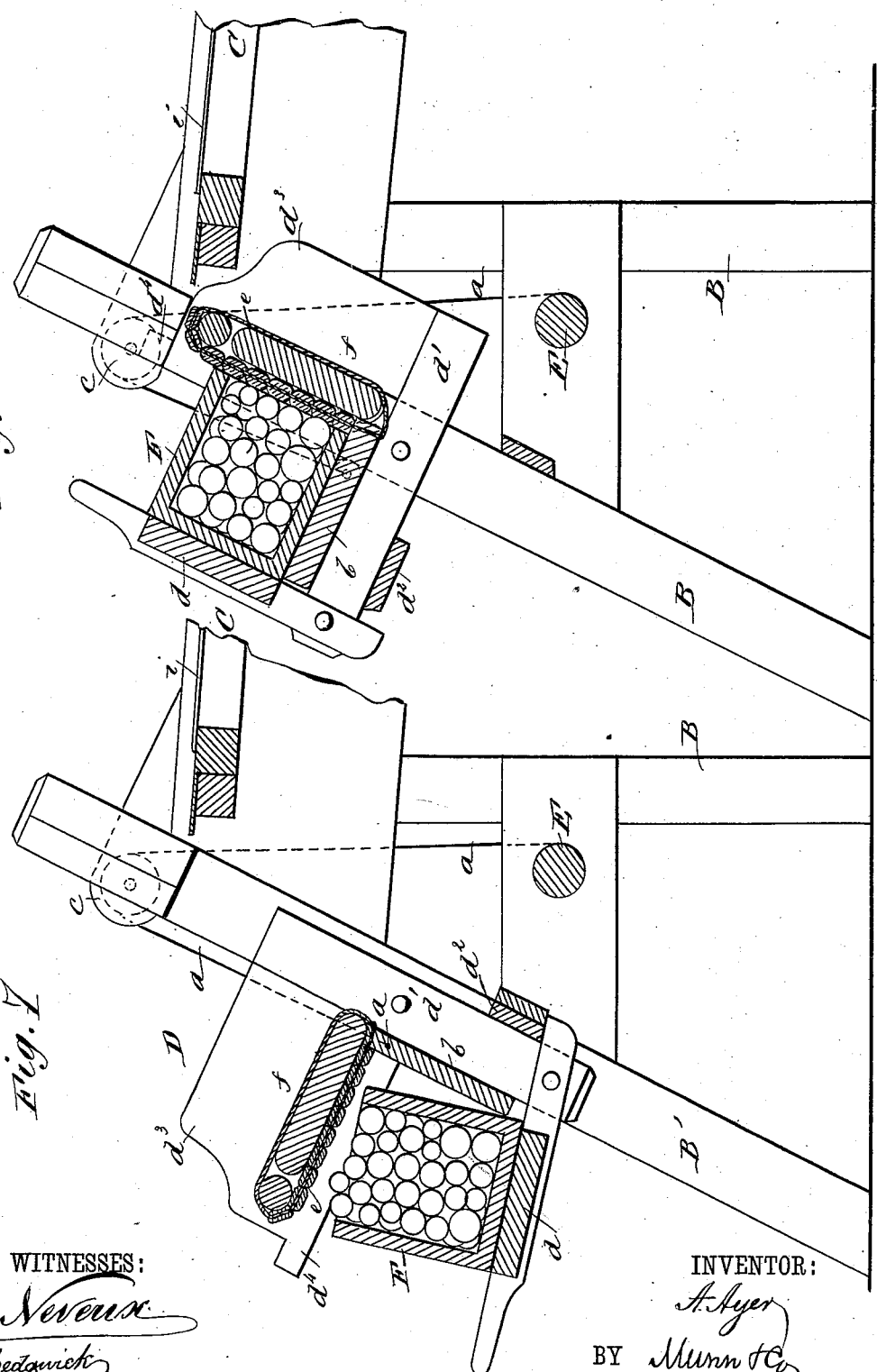
WITNESSES:
C. Neveux
C. Sedgwick
INVENTOR:
A. Ayer
BY Munn & Co
ATTORNEYS.

(Model.)

A. AYER.
MACHINE FOR SIZING ORANGES AND OTHER FRUIT.

No. 363,974. Patented May 31, 1887.

WITNESSES:
C. Neveux
C. Sedgwick

INVENTOR:
A. Ayer
BY Munn & Co.
ATTORNEYS.

UNITED STATES PATENT OFFICE.

ALFRED AYER, OF LAKE WEIR, FLORIDA.

MACHINE FOR SIZING ORANGES AND OTHER FRUIT.

SPECIFICATION forming part of Letters Patent No. 363,974, dated May 31, 1887.

Application filed July 19, 1886. Serial No. 208,419. (Model.)

*To all whom it may concern:*

Be it known that I, ALFRED AYER, of Lake Weir, in the county of Marion and State of Florida, have invented a new and Improved Machine for Sizing Oranges and other Fruit, of which the following is a full, clear, and exact description.

My invention relates to a machine for separating oranges and other fruit into grades of different sizes; and the object of my invention is to provide a machine adapted for easy and rapid operation, and so constructed that it will not bruise or otherwise injure the fruit.

The invention consists of a machine constructed and combined as hereinafter described and claimed.

Reference is to be had to the accompanying drawings, forming a part of this specification, in which similar letters of reference indicate corresponding parts in all the figures.

Figure 1:
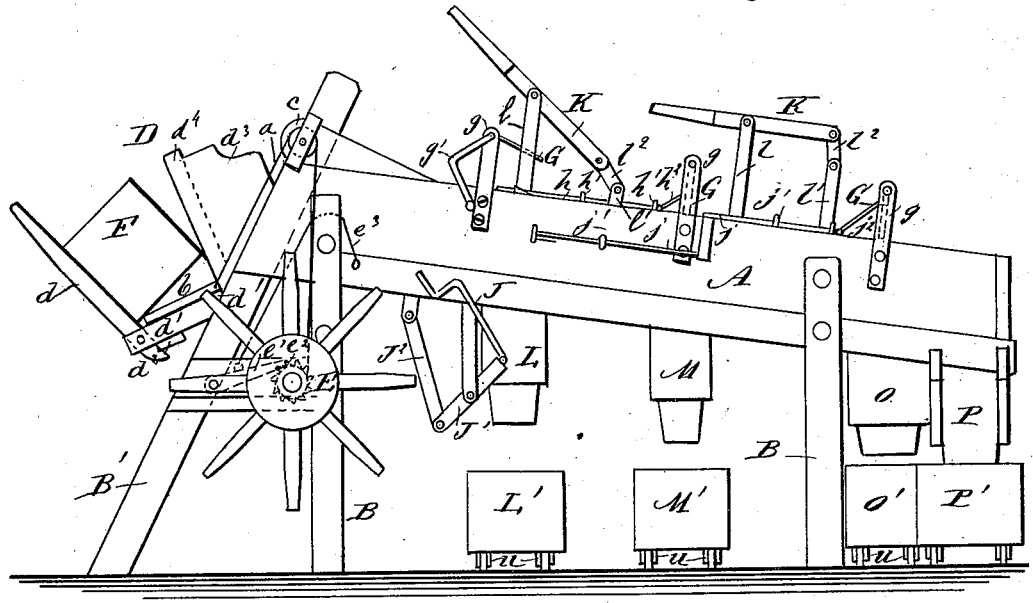
Figure 2:
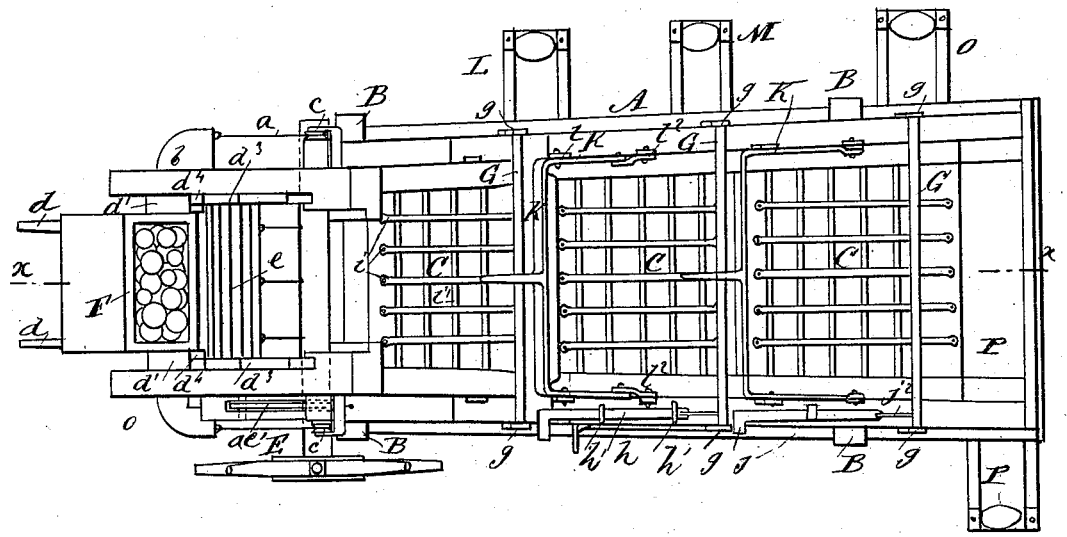
Figure 3:
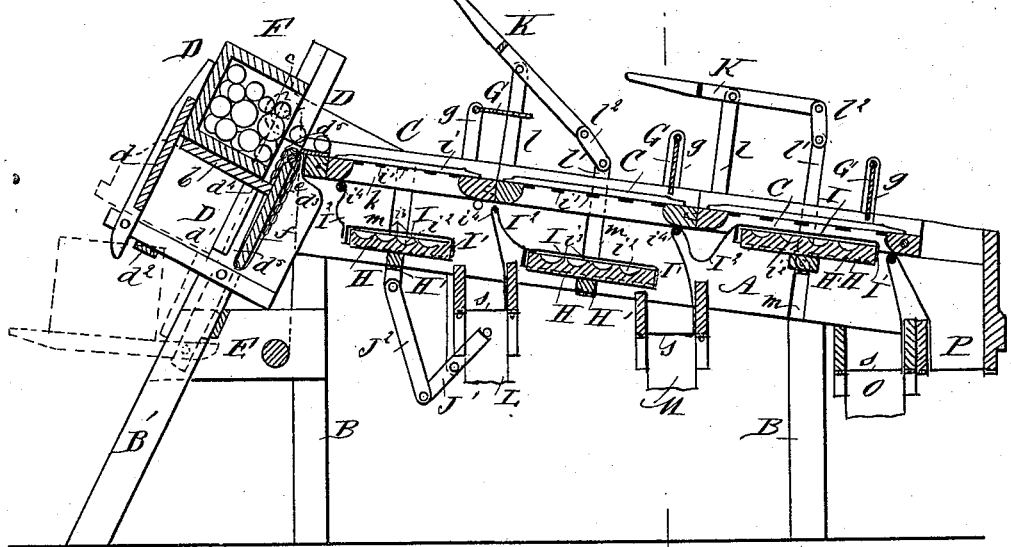
Figure 4:
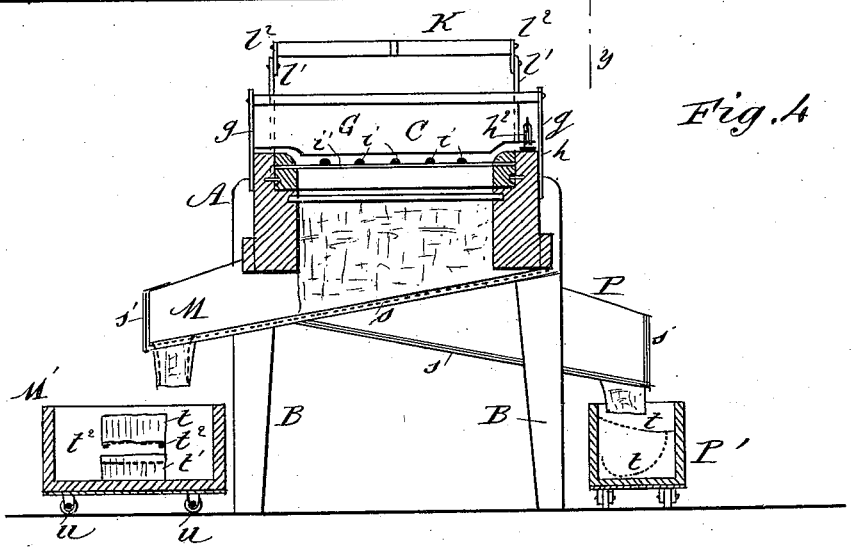
Figure 5:
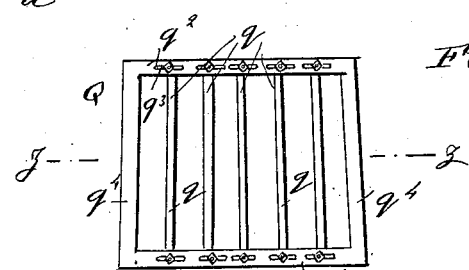
Figure 6:
Figure 9:
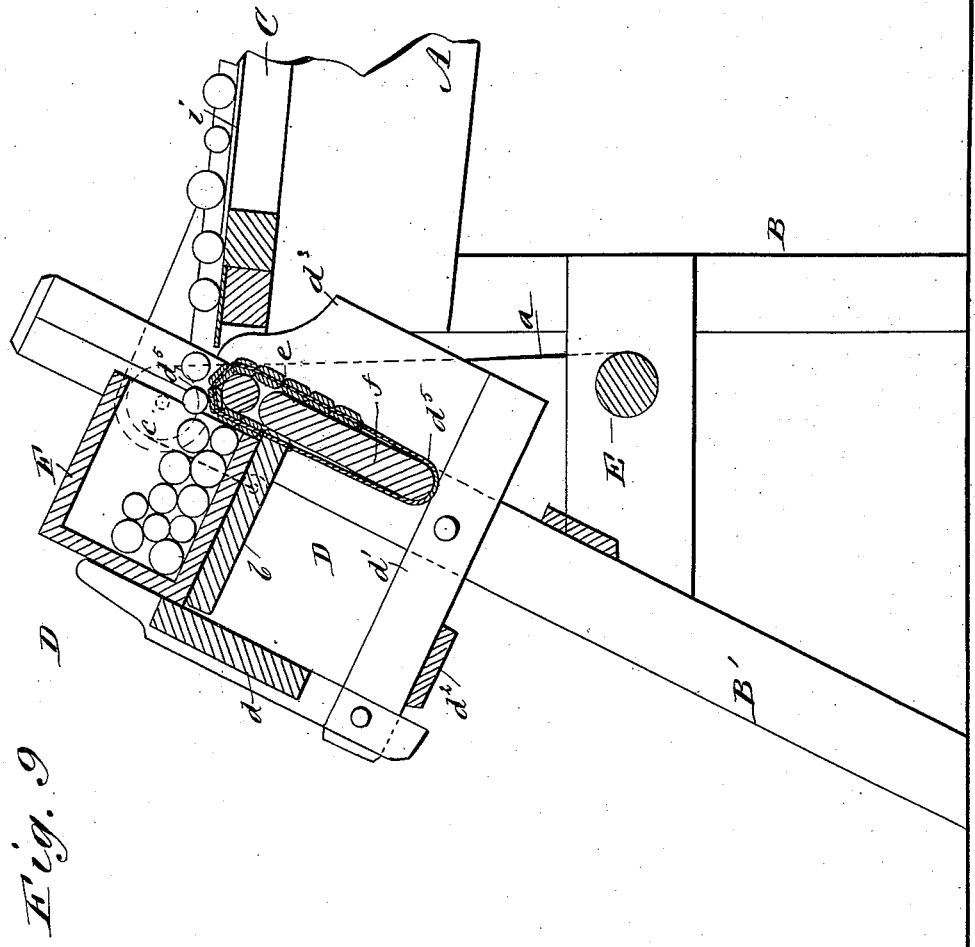

Figure 1 is a side elevation of my new and improved fruit-sizing machine. Fig. 2 is a plan view of the same. Fig. 3 is a longitudinal sectional elevation taken on the line $x\,x$ of Fig. 2. Fig. 4 is a transverse sectional elevation taken on the line $y\,y$ of Fig. 3. Fig. 5 is a plan view of a modified form of grading-frame. Fig. 6 is a sectional elevation taken on the line $z\,z$ of Fig. 5. Fig. 7 is an enlarged detailed sectional view of the front portion of the machine, showing the fruit-receptacle placed upon the platform of the elevating device, ready to be tipped and elevated. Fig. 8 is a similar view showing the elevating device in its second position, showing the position of the fruit-receptacle tipped against the traveling apron; and Fig. 9 is also a similar view showing the elevating device in its third position, the fruit-receptacle being raised thereby, so that the fruit rolls gently upon the grading-frames.

The main frame A of the machine is supported upon the legs B and front inclined legs, B', in an inclined position of suitable pitch to cause the oranges or other fruit to roll readily from one grading-frame C to the other, said frames being mounted in the frame A. The oranges are elevated to the grading-frame C by means of a hinged elevating device, D, adapted to be operated by a windlass, E, and ropes $a\,a$, which are connected at one end to the sliding elevating-board $b$, (which forms a part of the elevating device D,) and pass thence over the pulleys $c$, and are attached at their other ends to the axle of the windlass E, so that by turning said windlass the elevating device D may be raised to the position shown in full lines in Figs. 3 and 9, or lowered to that shown in dotted lines in said Fig. 3 and in full lines in Fig. 7. The said elevating device D is composed of the two main angle-frames $d'$, (which are united by the intermediate board, $f$, and cross-piece $d^2$, and are pivoted between the uprights B',) the platform $d$, pivoted between the outer extremities of the two angle-frames $d'$, the sliding elevating-board $b$, (above mentioned,) and the endless traveling apron $e$, placed upon the intermediate board, $f$, and connected to the inner edge of the said elevating-board $b$. The inclined legs B' form an inclined plane, against which the elevating device acts to elevate the fruit-receptacle for depositing the fruit upon the grading-frames.

The intermediate board, $f$, is secured between the side boards, $d^3$, which I prefer to use as shown in Fig. 3 to give strength to the elevating device. The outer surface of the intermediate board, $f$, together with the inner edges of the upper arms, $d^4$, of the two angle-frames $d'$ constitute ways $d^5$, in which the ends of the slats forming the endless apron $e$ move.

The platform $d$ is prevented from dropping below a horizontal position by the cross-piece $d^2$, and when the whole elevating device D is lowered to the position shown in dotted lines in Fig. 3 and in full lines in Fig. 7 the said platform $d$ drops of its own weight to a horizontal position to receive the receptacle F of fruit. The receptacle F, when placed upon the platform $d$, rests against the sliding elevating-board $b$, the same having dropped to its lowermost position in consequence of there being no strain upon the cords $a$.

The receptacle F being filled with oranges and placed upon the platform $d$, in order to elevate and pour the oranges gently upon said sieves, it is only necessary to turn the windlass E, which will first turn the elevating device D on its pivots to the position shown in full lines in Figs. 1 and 8, tipping the receptacle F against the apron $e$. At this time the sliding board $b$, to which the cords $a$ are attached, will slide upward against the outer edges of the bars $d^4$, which movement will elevate the receptacle F and the oranges contained therein, and at the same time turn the endless apron $c$, (the same being connected to the board $b$,) which will gently transfer the oranges from the receptacle F to the first or upper grading-frame C, and prevent all friction in the ascent of the fruit, as will be understood from Fig. 9.

The windlass E may be locked to hold the pivoted elevating device D and board $b$ at any desired position by means of the pawl $e'$ and the ratchet $e^2$. The receptacle F of oranges having been thus emptied upon the first grading-frame C the pawl $e'$ will be elevated out of contact with the ratchet $e^2$ by drawing upon the cord $e^3$, Fig. 1, which will release the windlass and permit the elevating device D, sliding board $b$, platform $d$, and the receptacle F to drop by their own weight back to the position shown in dotted lines in Fig. 3 and in full lines in Fig. 7, ready to repeat the operation.

The machine shown in this instance is adapted to separate the oranges into four sizes, there being three grading-frames C, of different-sized mesh, fitted in the main frame A; but it is obvious that a greater or less number of grading-frames may be used, if desired. To prevent the oranges from rolling directly over the grading-frames or from one grading-frame immediately to the other as they are poured upon the upper grading-frame from the receptacle F, I pivot to the uprights $g$, attached to the opposite sides of the frame A, at or near the lower edge of each grading-frame C, the gates G, which, when closed, confine the oranges on their respective grading-frames C. The upper gate G is opened and closed by the lever $g'$, Fig. 1. The central gate in this instance is operated by a sliding bar, $h$, held to the upper edge of the frame A by the staples $h'$, in which it freely slides, and is connected at its lower end to the gate by the link $h^2$, so that by sliding the said plate $h$ toward the foot of the machine the central gate will be opened, and by sliding it in the opposite direction said gate will be closed. The lower gate G is operated in this instance by a sliding angle-rod, $j$, held to the side and upper edge of the frame A by the staples $j'$, and connected to the said lower gate by the link $j^2$. The upper ends of the sliding bars $h$ $j$ reach nearly to the lever $g'$, so that a person standing near the lever $g'$ may operate all of the gates without moving his position.

The grading-frames C are by preference formed of the longitudinal ribs $i$ $i$, made of round or half-round iron and the lower flat plates or strips of metal, $i'$, set in suitable frames, $a$, so that the oranges, in passing upon the grading-frames, will not be cut or bruised by coming in contact with any sharp metallic edges; and beneath each grading-frame C is placed a vertically-sliding table, H, each table being adapted to be elevated into contact with the grading-frame C, as shown at the right of Fig. 3, to form a bed or support for the oranges, or for that portion of the oranges which projects down through the meshes of the grading-frame, so that, being thus supported by the tables H, the oranges will not come into injurious contact with the metal strips composing the grading-frame, nor become fast in the meshes of the grading-frames. To still further protect the oranges from injurious contact with the metallic portions of the grading-frame, I place upon the tables H the cushions I, and form in the upper surfaces of the tables the grooves $i^2$, which form the intermediate ribs, $i^3$, which are adapted to project up through the meshes of the grading-frames, so that the cushions I will be pushed somewhat up into each mesh and form therein a separate cushion for each mesh of the grading-frame. The cushions I in this instance are each composed of a fabric stretched upon a frame, I', (surrounding the table H,) and an apron, I², connecting each cushion with a cross-rod, $i^4$, which apron is of less width than the distance of vertical movement of the tables H, so that when the tables H are dropped to their lowermost positions the aprons I² will slightly elevate the frames I' and cushions I, and thus prevent the oranges, as they drop from the grading-frames, from falling in contact with the upper surfaces of the tables. The tables H may be moved vertically by various means. In this instance the upper table is raised and lowered by a lever, J, connected to the pivoted frame J', the latter being connected to the cross-bar H' (to which the table is secured) by connecting-rods J², so that by moving the upper end of the lever J backward or toward the foot of the apparatus the said upper table will be elevated, and the reverse movement of the lever J will lower the table. The central and lower tables H in this instance are moved vertically, each by a frame, K, pivoted between uprights $l$, secured to the side of the main frame A, and connected to arms $l'$ by the links $l^2$, the arms $l'$ being connected at their lower ends to the cross-pieces H', to which cross-pieces the said tables are attached. The cross-piece H' of each table H is fitted at the ends in grooves $m$, (shown in Fig. 3,) which guide the tables in their up and down movements.

In operation the upper table H will first be elevated into contact with the upper grading-frame C and all of the gates G will be closed, so that the upper gate will confine the oranges upon the upper grading-frame as they are poured upon the grading-frame from the receptacle F, as above described. The upper grading-frame being thus filled, the table H will be lowered to permit all of the oranges of a small size to drop through the meshes of the grading-frame upon the cushion I, from whence they will roll into the spout L, which will direct them to the proper box or receptacle L', located on the floor beneath the spout L. The upper table H will now be again raised into contact with the upper grading-frame C, and at the same time the upper gate G will be opened. The upward movement of the upper table H will lift the oranges remaining upon the grading-frame C and cause them to roll upon the second grading-frame C, which is of a mesh a size larger than that of the upper grading-frame. This will separate from the oranges the next size, which will pass to the spout M and be conducted thereby to the receptacle M'. The central table H will now be raised into contact with the central grading-frame C and the central gate G opened, which will cause the oranges remaining upon the central grading-frame to roll to the grading-frame below, which is of a mesh larger than that of the central grading-frame. The oranges which pass through the meshes of this grading-frame are conducted by the spout O to a receptacle, O', while the largest oranges will pass under the lower gate G, when opened, into the lower spout P, from whence they will pass to a suitable receptacle, P'.

In case the oranges or other fruit to be sized are not round, but oblong in form, the sieves C are to be removed from the machine and the grates Q (shown in Figs. 5 and 6) substituted therefor in the machine. These grates are composed of the parallel bars $q$, of round or half-round iron, secured above the blocks $q'$. The blocks are made fast to the end pieces, $q^2$, by bolts passed through the blocks and through the slots $q^3$ made in the said side pieces, so that by loosening the bolts the rods $q'$ may be adjusted to or from each other to suit oranges of different sizes. The end pieces, $q^2$, are united by the side pieces, $q^4$, forming a complete frame for the grate, and the grate-frames are made to exactly correspond in size with the sieve-frames. It will be understood that the windlass E is simply one of the many means of power which I may employ for lifting the elevating device and its burden of fruit to deposit the latter upon the sieves or grates.

The spouts L M O are formed mainly of fabric—that is, the bottom $s$ and end piece, $s'$, of each spout is of fabric to prevent injuring the fruit that drops into the spouts and rolls against the end pieces; and to prevent injury of the fruit as it drops from the spouts into the boxes placed to receive it, I place in each box two cloth spouts, $t\ t'$. (Shown at the left in Fig. 4.) The spout $t$ is arranged above the spout $t'$, and is formed of two wires, $t^2\ t^2$, secured in the side of the box and the canvas $t$ is stretched over the wires. The lower spout, $t'$, is formed in a similar manner, and it reaches from the opposite side of the box slightly under the spout $t$, so that the fruit first striking upon the upper spout and rolling therefrom will not fail to strike upon the lower spout, which will conduct the fruit gently to the bottom of the box; and the boxes for receiving the fruit are placed upon casters $u\ u$, so that when filled with fruit they may be easily moved along the floor transferring the fruit to be wrapped and packed.

I do not limit myself to the exact construction and arrangement of parts as shown, as the same may be varied within the scope of my invention, which consists, essentially, of a series of suitably-supported sizing-screens, an elevating device for raising an orange-receptacle and gradually discharging the oranges upon the screens, and of cloth-covered receptacles for the oranges arranged below the screen.

Having thus described my invention, what I claim as new, and desire to secure by Letters Patent, is—

1. In a machine for sizing oranges and other fruit, an inclined main frame and several grading-frames mounted therein, in combination with an elevating device, means for operating the same, and the traveling apron $e$, all arranged to operate substantially as described.

2. In a machine for sizing oranges and other fruit, the combination of the supporting-frame, the elevating device comprising pivoted angle-frames $d'$, the platform $d$, the cross-piece $f$, the board $b$, the pulleys $c$, the windlass E, and the cords $a$, which pass over the pulleys $c$ and are connected to the board $b$, substantially as and for the purposes set forth.

3. In a machine for sizing oranges and other fruit, the main inclined frame, the grading-frames, the elevating device, means for operating the same, and the sliding board $b$, in combination with the cross-piece $f$ and the endless apron $e$, substantially as described.

4. In a machine for sizing oranges and other fruit, the main frame, the grading-frames, the angle-frames $d'$, and the pivoted platform $d$, in combination with the board $b$, windlass E, windlass-cords $a$, cross-piece $f$, and endless apron $e$, attached to the board $b$, substantially as described.

5. In a machine for grading oranges and other fruit, a main inclined frame, several grading-frames, and the tables H, located beneath the grading-frames, in combination with suitable levers connected to the tables for moving the tables vertically, substantially as described.

6. In a machine for sizing oranges and other fruit, the combination of the main inclined frame and the grading-frames mounted therein, the inclined tables H, means for moving the same vertically in their inclined position, and the webs I, fastened above the said tables and passing over the same so as to become tense when the tables reach the limit of their downward movement, substantially as described.

7. In a machine for sizing oranges and other fruit, the combination, with the main inclined frame and the grading-frames mounted therein, of the tables H, having ribs $i^3$, webs I, and means for moving the tables vertically, substantially as described.

8. In a machine for sizing oranges and other fruit, the main inclined frame, the grading-frames mounted therein, the tables H, and means for moving the tables vertically, in combination with the frames I', aprons I², and rods or bars $i^4$, substantially as described.

ALFRED AYER.

Witnesses:
F. S. PERRIN,
S. M. G. GARY.